(No Model.)
W. J. WAYNE.
SIDE SPRING VEHICLE.
No. 309,423. Patented Dec. 16, 1884.
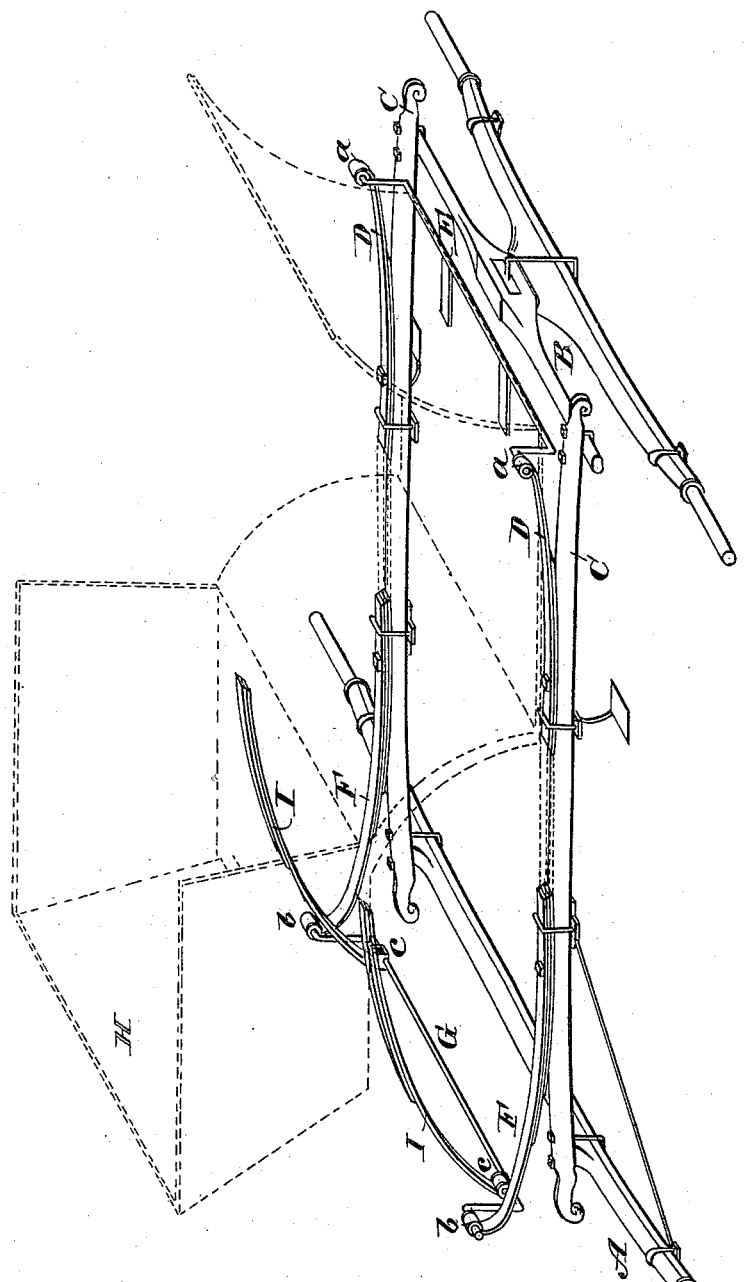
WITNESSES:
Otto Beyer
C. Sedgwick
INVENTOR:
W. J. Wayne
BY Munn & Co.
ATTORNEYS.

UNITED STATES PATENT OFFICE.

WILLIAM JEROME WAYNE, OF DECATUR, ILLINOIS.

SIDE-SPRING VEHICLE.

SPECIFICATION forming part of Letters Patent No. 309,423, dated December 16, 1884.

Application filed March 13, 1884. (No model.)

*To all whom it may concern:*

Be it known that I, WILLIAM J. WAYNE, of Decatur, in the county of Macon and State of Illinois, have invented a new and Improved Side-Bar-Buggy Gearing, of which the following is a full, clear, and exact description.

My invention relates to the class of vehicles known as "side-bar" buggies or wagons; and it consists in an arrangement of cranked rods and leaf-springs, by which the greatest elasticity of the springs is realized without imposing undue strain on the side bars or body of the vehicle, substantially as hereinafter more fully described, and pointed out in the claim.

Reference is to be had to the accompanying drawing, forming a part of this specification, in which the figure is a perspective view of the running-gear of a side-bar buggy having my improvement applied thereto.

Upon the rear axle, A, and front bolster, B, are secured side bars, C, in the usual manner, by means of clips. Near the forward end of the side bars are secured leaf-springs D, by means of clips and bolts, and in the eyes $a$, formed upon the forward ends of the springs D are inserted the ends of the cranked bar E. The bar E is rigidly attached to the under side of the forward end of the vehicle-body, and its ends are bent upward at right angles, then outward horizontally to receive the eyes $a$. Curved leaf-springs F are secured to the side bars, C, at a point back of the center of the vehicle, and extend rearward and upward over the rear ends of the side bars, and are provided with eyes $b$, for receiving the ends of the cranked bar G. The bar G extends from the eyes $b$ downward at right angles for a short distance, thence across the rear of the vehicle.

To the vehicle-body H, at opposite sides, are secured two leaf-springs, I, extending rearwardly and curving downward, and receiving in their eyes $c$ the ends of the lower part of the cranked bar G. This device of interposing a crank between the upper leaf-springs, I, and lower leaf-springs, F, admits of the free straightening and elongation of both sets of springs, allowing the springs to make their maximum movement without end resistance or cramping of any kind. It renders the movement of the vehicle-body very easy and agreeable, and greatly increases the durability of the springs.

I do not limit or confine my invention to the exact form and arrangement herein shown and described, as they may be varied without departing from the spirit of my invention.

Among other obvious modifications, the springs F D may be united, as indicated in dotted lines.

I am aware that, broadly, the employment of a curved spring and a semi-elliptic spring connected by a crank-rod is old, as is also a crank-rod connected to the vehicle-body and to the ends of a leaf-spring clipped to the side bars.

Having thus described my invention, I claim as new and desire to secure by Letters Patent—

The side-bar-buggy gearing comprising the side bars, C, with the springs F D, secured thereon and curved upward at their ends, the crank-rods E G, depending from the ends of said springs, one of said rods being connected directly to the vehicle-body at its bottom, and the quarter-elliptic springs I, connected to the lower portion of the crank-rod G and to the vehicle-body, substantially as shown and described.

WILLIAM JEROME WAYNE.

Witnesses:
JNO. R. WILLIAMS,
A. BRADLEY.